(12) United States Patent
Jin et al.

(10) Patent No.: US 6,422,611 B1
(45) Date of Patent: Jul. 23, 2002

(54) CONTRACTIBLE JOINT DEVICE FOR METAL CONDUIT

(75) Inventors: Jiesheng Jin; Yushi Zhou; Yuefang Liu; Chicheng Luo, all of No. 1 Shuidian Road, Dongjiang, Zixing City, Hunan 423403; Gengwu Li, Zixing; Jiajing Pan, Zixing; Zihan Liao, Zixing; Xiaohong Li, Zixing; Xia Li, Zixing; Youren Rui, Zixing; Shamen Ou, Zixing; Jiyao Yang, Zixing; Xijin Zhao, Zixing; Zhu Li, Zixing; Xueqin Li, Zixing; Jianmin Deng, Zixing, all of (CN)

(73) Assignees: Jiesheng Jin; Yushi Zhou; Yuefang Liu; Chicheng Luo, all of Zixing City (CN)

( * ) Notice: Subject to any disclaimer, the term of this patent is extended or adjusted under 35 U.S.C. 154(b) by 0 days.

(21) Appl. No.: 09/600,353

(22) PCT Filed: Oct. 15, 1998

(86) PCT No.: PCT/CN98/00246

§ 371 (c)(1),
(2), (4) Date: Aug. 22, 2000

(87) PCT Pub. No.: WO99/36723

PCT Pub. Date: Jul. 22, 1999

(30) Foreign Application Priority Data

Jan. 16, 1998 (CM) ........................................ 98230056 U
Apr. 21, 1998 (CN) ............................................ 98112442

(51) Int. Cl.⁷ ................................................ F16L 27/12
(52) U.S. Cl. ......................... 285/300; 285/226; 92/42
(58) Field of Search ................................. ; F16L 27/12

(56) References Cited

U.S. PATENT DOCUMENTS

| | | | | | |
|---|---|---|---|---|---|
| 1,889,868 | A | * | 12/1932 | Montgomery | 285/299 |
| 2,018,613 | A | * | 10/1935 | Hall | 285/300 |
| 2,044,430 | A | * | 6/1936 | Hall | 285/300 |
| 2,313,490 | A | * | 3/1943 | Lauffer | 285/300 |
| 2,490,513 | A | * | 12/1949 | Dreyer | 92/42 |
| 2,886,885 | A | * | 5/1959 | Reid, Jr. | 285/226 |
| 2,893,431 | A | * | 7/1959 | Bowditch | 92/42 |
| 2,920,656 | A | * | 1/1960 | Bertolet, Jr. | 285/226 |
| 3,135,295 | A | * | 6/1964 | Ziebold | 285/226 |
| 3,527,481 | A | * | 9/1970 | Lewis | 285/226 |
| 3,633,945 | A | * | 1/1972 | Press | 285/226 |
| 5,145,215 | A | * | 9/1992 | Udell | 285/226 |
| 5,782,506 | A | * | 7/1998 | Uematsu et al. | 285/299 |
| 5,806,899 | A | * | 9/1998 | Norikawa et al. | 285/299 |

FOREIGN PATENT DOCUMENTS

| | | |
|---|---|---|
| CN | 2083677 | 8/1991 |
| CN | 2180868 | 10/1994 |
| CN | 2236064 | 9/1996 |
| CN | 2265469 | 10/1997 |

* cited by examiner

Primary Examiner—Lynne H. Browne
Assistant Examiner—David E. Bochna
(74) Attorney, Agent, or Firm—Ladas & Parry

(57) ABSTRACT

An expansion joint device (10) used for metal conduits comprises an inlet short tube (1), an outlet short tube (2), and a sleeve (3). Both the opposed inside ends of the two short tubes (1, 2) are in the inside of the sleeve (3) and form a compensating gap (6) between them. A bellows member (7), axially expansible with an external force applying on, is provided in the compensating gap (6) formed between the opposed inside ends of the two short tubes (1, 2). The two ends of the bellows member (7) are respectively connected with the inside ends of the two short tubes (1, 2) in sealed manner. At least one of the two ends of said sleeve (3) is free end with respect to the two short tubes (1, 2).

3 Claims, 4 Drawing Sheets

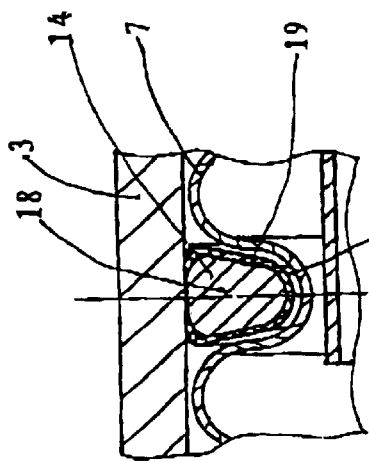
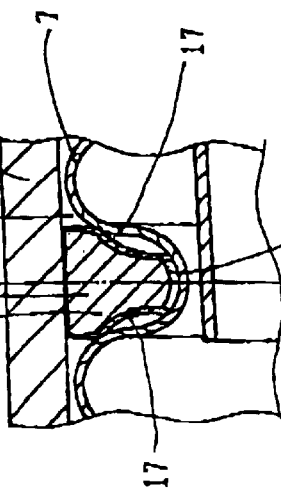
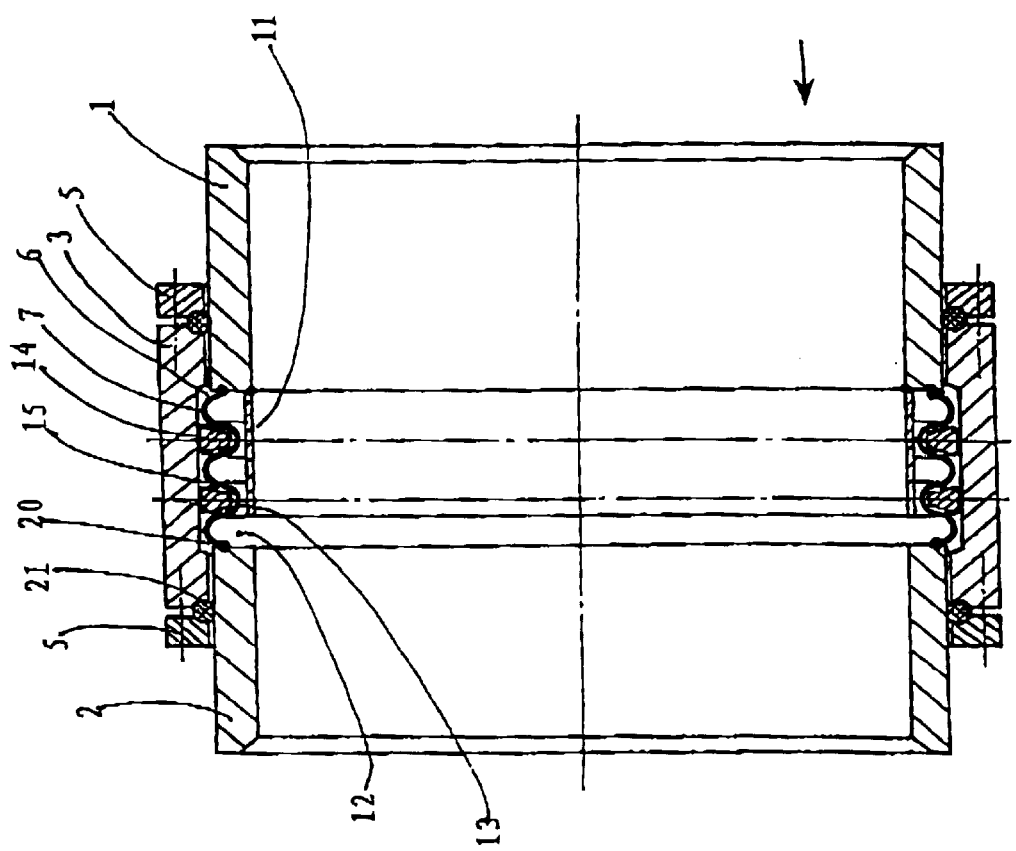

CONTRACTIBLE JOINT DEVICE FOR METAL CONDUIT

TECHNICAL FIELD

The present invention relates to an expansion joint device, which is used for connecting the ends of metal conduits during laying metal pipelines. More specifically, the present invention relates to an expansion joint device useful for connecting the pressurized medium-conveying pipes, for examples, for connecting the ends of steel pipes used in the water-diversion pipelines of a hydropower station.

BACKGROUND ART

For the metal conduits for conveying water, oil, gas or other mediums, especially for those with comparable large or large-size diameters, such as the steel pipes in the water-diversion pipelines of a hydropower station, the pipes can be expanded or contracted by the effects of physical behavior of the conveyed medium and the changes of the ambient temperature during the operation process, and the induced thermal stress may cause the pressurized pipes to be damaged. Therefore, as the metal conduits being laid, expansion joint device need to be provided at the ends of the pipes as being connected to each other.

FIG. 1 shows a currently used expansion joint device for metal conduits. The expansion joint device comprises two short tubes 1', 2' and a sleeve 3'. One end of the sleeve 3' is sealed and connected with the wall of the short tube 1', and the other end of the sleeve 3' is engaged with the short tube 2' on the outer wall surface of the end portion. A sealing ring 4' is provided in the engaging portion and is fixed by a holding ring 5' A compensating gap 6' is set between the opposed inside ends of the two short tubes. As the changes in the axial dimensions of the pipes arise from their thermal deformations, the opposed ends of the two short tubes can axially move to each other, and hence the thermal stresses can be released. Such traditional sleeve-type expansion joint device can have a simple structure, but the short tubes are susceptible to be radially distorted by the effects of the external forces applied during the fabrication and installation processes, and hence the sealing ring 4' can hardly take its due play of satisfactorily avoiding leakage, especially in the case of conveying the highly pressurized medium. For this reason, in the practical use, water-logging wells need to be prepared below the expansion joint device, and the water leaked into the wells needs to be aperiodically discharged. As a result, the running expenses are increased, and the hidden trouble for safety always exists.

SUMMARY OF THE INVENTION

It is therefore an object of the present invention to provide an expansion joint device used for metal conduits with no leakage.

It is another object of the present invention to provide an expansion joint device used for metal conduits, which can avoid leakage of large-size diameter, highly pressurized metal conduits, and has a stable and reliable working performance.

According to the first aspect of the present invention, an expansion joint device for metal conduits is provided, which comprises an inlet short tube, an outlet short tube and a sleeve, the opposed inside ends of said two short tubes are both in the inside of the sleeve and form a compensating gap between them, and wherein a bellows member, axially expansible with an external force applying on, is provided in the compensating gap between the opposed inside ends of the two short tubes, and the two ends of the bellows member are respectively connected to the inside ends of the two short tubes in an sealed manner, at least one of the two ends of said sleeve is free end with respect to the two short tubes.

Because the bellows member in the compensating gap is capable of axially expanding or contracting due to an external force applying on, and its two ends are sealed and connected with the inside ends of the two short tubes, the expansion joint device of the invention can both accommodate the axial dimension changes of the pipes caused by their thermal deformations, to release the thermal stresses, and effectively avoid leakage occurrence so as to prevent safety accidents that may be caused by pipeline leakage.

According to the second aspect of the present invention, an expansion joint device for metal conduits is provided based on the first aspect of the present invention, wherein a trough in a ripply node of the inside-oriented ripple in the bellows member is provided with a trough-mated core, and a gap is formed between the surfaces of the trough and the trough-mated core, and the gap enables the ripply node to be deformed without exceeding its elasticity limit.

According to the third aspect of the present invention, an expansion joint device for metal conduits is provided based on the second aspect of the present invention, wherein an antiwear ring is connected to the inside end of the inlet short tube, and a gap is formed between the other end of the antiwear ring and the inside end of the outlet short tube, and a gap is formed between the outer wall surface of the antiwear ring and the crests of the ripply nodes of the inside-oriented ripple in the bellows member.

Because said trough-mated core is provided, the bellows member can serve as an effective rigid support. And, with the aid of the antiwear ring, the abrasion of inner wall surface of the bellows member by the conveyed medium can be reduced effectively. Accordingly, as being used in large-size and highly pressurized conveying pipelines, the expansion joint device can effectively protect the connecting portion of bellows member itself with the inside ends of the short tubes from damage.

The above and other objects, features, and advantages of the present invention will appear more clearly to one skilled in the art by reading the following detailed specification about the preferred embodiments of the invention in conjunction with the accompanying drawings.

BRIEF DESCRIPTION OF THE DRAWINGS

FIG. 5 shows a partial enlarged sectional view of the trough-mated core in accordance with the embodiment of the expansion joint device shown in FIG. 4;

FIG. 6 shows a partial enlarged sectional view of the trough-mated core in accordance with another embodiment of the expansion joint device shown in FIG. 4;

FIG. 7 shows a sectional view of a variation of the expansion joint device of FIG. 4.

PREFERRED EMBODIMENTS OF THE INVENTION

Hereinafter, detailed explanation of the embodiments according to the present invention will be given by referring attached drawings.

Figure 1:
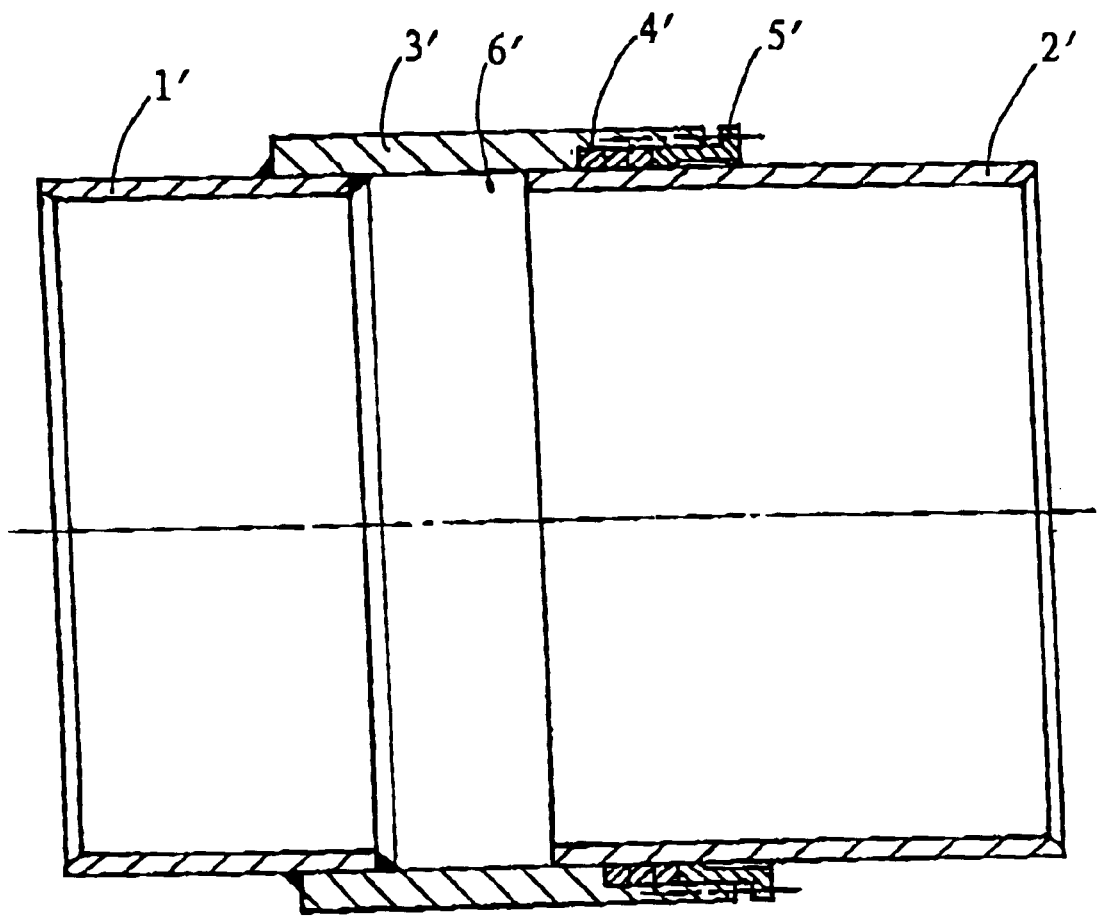
FIG. 1 shows a sectional view of an expansion joint device in accordance with the prior art.
Figure 2:
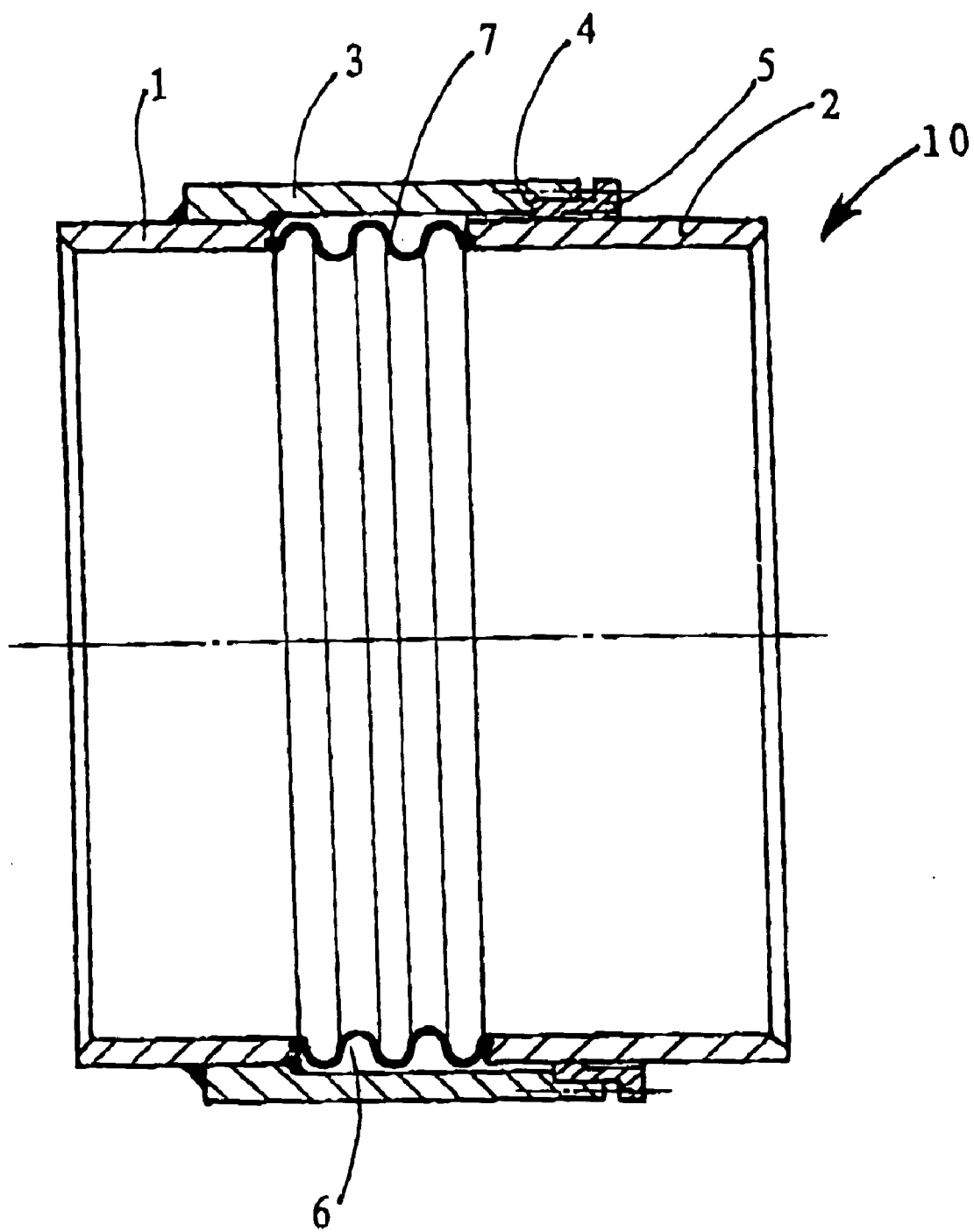
FIG. 2 shows a sectional view of an expansion joint device in accordance with the first preferred embodiment of the invention.

As shown in FIG. 2 and in accordance with the first preferred embodiment of the present invention, the expansion joint device 10 comprises two substantially cylindrical inlet short tube 1, outlet short tube 2 and a cylindrical unitary-type sleeve 3. The opposed inside ends of said two short tubes 1, 2 and both in the inside of the sleeve 3. One end of the sleeve 3 is welded to the outer wall of the inside end of the short tube 1, and the other end as a free end is axially movable along the outer wall of the short tube 2. A bellows member 7 is provided in a compensating gap 6 formed between the opposed inside ends of the two short tubes 1, 2, and the two ends of the bellows member 7 are respectively connected with the inside ends of the two short tubes 1, 2 in a sealed manner. The bellows member 7 has at least one, particularly five in the embodiment, ripply nodes. Furthermore, the ripply node in the embodiment has a circular profile, which can undoubtedly be alternated with other proper types of profile. A recessed section is made on the sleeve 3 at the end portion of engaging the short tube 2, in which a holding ring S is placed. The holding ring 5 is fastened on the respective end portion of the sleeve 3 with bolts.

Figure 3:
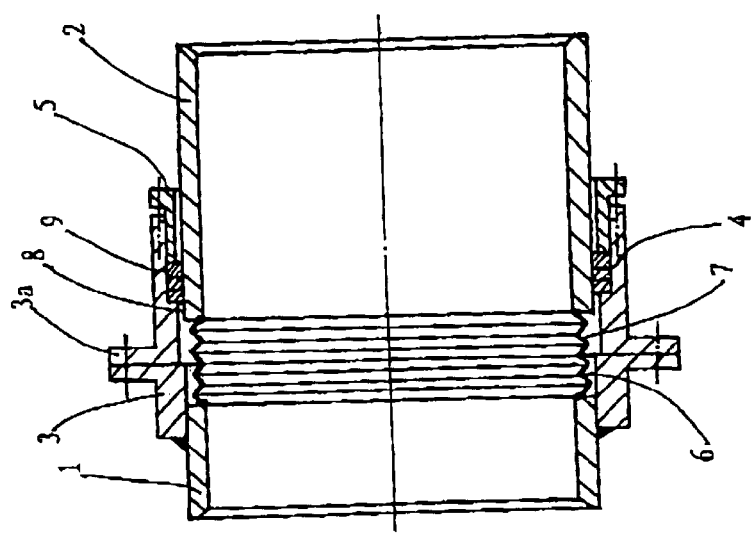
FIG. 3 shows a sectional view of a variation of the expansion joint device of FIG. 2.

FIG. 3 shows a variation of the expansion joint device 10 in accordance with the first embodiment of the invention, and its difference from said first embodiment is that the bellows member 7 has a wrinkling configuration with the cross section of the ripply node having a hackle-like, preferably semicircle or crest-rounded profile. Additionally, the partible structure of the sleeve 3 is of benefit to the fabrication and installation of the expansion joint device. Furthermore, a fitting gap 8 is formed between the inner surface of the right end 3a of the sleeve 3 and outer surface of the short tube 2 and between the inner surface of the holding ring 5 and the outer surface of the short tube 2, which can accommodate a micro deformation that might be generated by nonuniform radially yielding the pipe. A sealing ring 9 is provided between the inner surface of the right end 3a of the sleeve 3 and outer surface of the short tube 2, which is located in a recess portion 4 formed in the right end portion 3a of the sleeve 3 and is tightened by the holding ring 5. The holding ring 5 is fastened on the right end portion 3a of the sleeve 3 with bolts.

Figure 4:
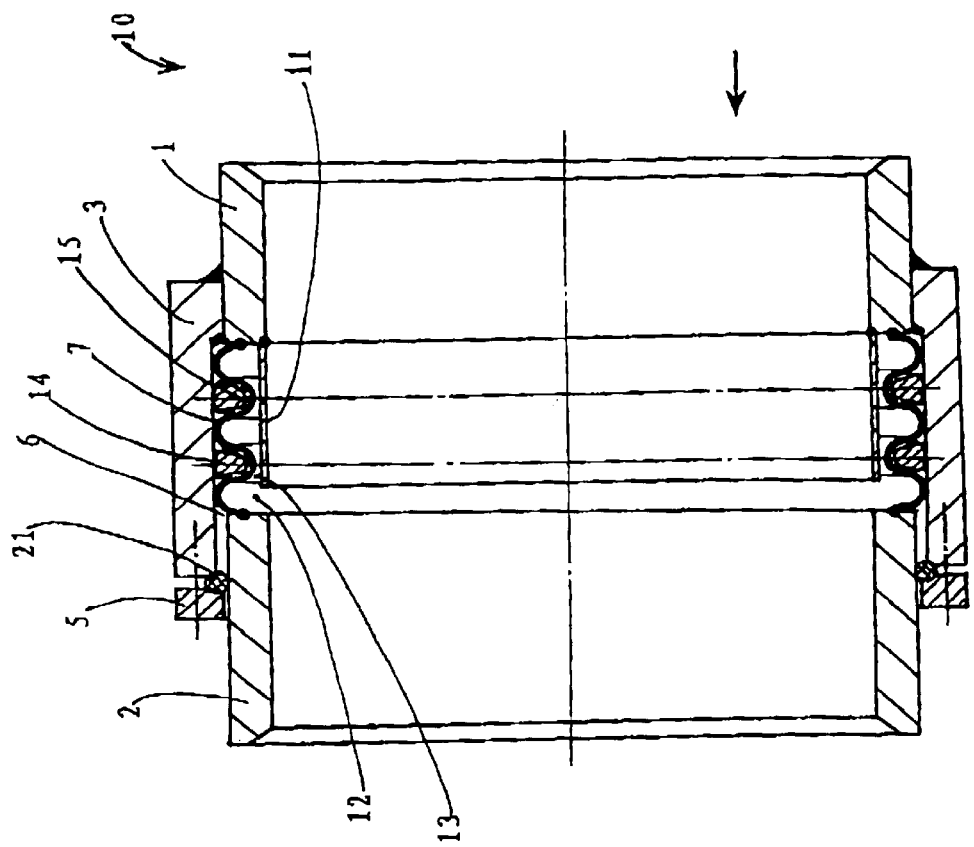
FIG. 4 shows a sectional view of an expansion joint device in accordance with the second preferred embodiment of the invention.

The expansion joint device in accordance with the first embodiment of the invention can be useful for supporting the two short tubes 1, 2 and protecting the outside of the bellows member 7, and the bellows member 7 is also designed to serve as a conveying pipe as the medium passing therethrough. Thus, the expansion joint device in accordance with the first embodiment of the invention is preferably used for conveying the low or normal pressurized medium. Referring now to FIG. 4, which shows the structure of the expansion joint device in accordance with the second embodiment of the invention, and in which the same reference numbers indicate the same or similar members of those shown in the drawings for the first embodiment. Said expansion joint device 10 comprises an inlet short tube 1, an outlet short tube 2, and a sleeve 3, the opposed inside ends of said two short tubes 1, 2 are both in the inside of the sleeve 3, and a stainless steel-made bellows member 7 is provided in a compensating gap 6 formed between the inside ends of the two short tubes 1, 2, wherein the two ends of the bellows member 7 are respectively connected with the inside ends of the two short tubes 1, 2 in a sealed manner and the crest of the ripply nodes of the outside-oriented ripple of said bellows member 7 contacts or tends to contact the inner wall surface of said sleeve 3. The size of the gap 6, the length of the bellows member 7 and the number of the ripply nodes are evaluated and determined according to the amount of axial deformation of the metal conduits. The right end of the sleeve 3 is rigidly connected to the outer surface of short tube 1 by welding or other proper manners. The left end of the sleeve 3 is free end and a holding ring 5 bolted thereon is provided, and a sealing ring 21 is provided between the engaging surfaces of the holding ring S and the sleeve 3, and the inner surface of the sealing ring 21 contacts the outer wall surface of the short tube at the same side. As an axial deformation generated in the metal conduit, the sleeve 3 and the short tube 1 exhibit axial displacements with respect to the short tube 2, and hence the bellows member 7 is compressed or extended.

Referring to FIGS. 5 and 6, a trough in a ripply node of the inside-oriented ripple in the bellows member is provided with a trough-mated core 14, and a gap 15 is formed between the surfaces of the trough and the trough-mated core 14, the gap 15 allows the bellows member 7 to exhibit its deformation as being compressed or extended. The size of the gap 15 is determined according to the amount of deformation shared by the respective ripply node and allows the ripply node, as a radial force is applied on, to be supported by the trough-mated core 14 within its elasticity deformation limit. The outer wall surface of the trough-mated core 14 contacts or tends to contact the inner wall surface of the sleeve 3. FIG. 5 shows a type of structure of the trough-mated core 14, which consists of a rigid body 16 and two elastic bodies 17 attached to the two side surface of said rigid body 16 respectively. As the elastic bodies 17 are compressed to some extent, the rigid body 16 of the trough-mated core 14 comes into effect of supporting the ripply node FIG. 6 shows another type of structure of the trough-mated core 14. The trough-mated core 14 consists of a rigid body 18 and a flexible layer 19 laid on the surface of the rigid body 18. As the ripply node 14 exhibits an inward deformation caused by an applied radial force, the flexible layer 19 will be compressed firstly. As the flexible layer 19 is compressed to some extent, the rigid body 18 comes into effect of supporting the ripply node. It is suggested that the trough-mated core 14 be formed in a configuration of multi-segments and then arranged circumferentially one by one.

Besides, FIGS. 4, 7 show that an antiwear ring 11 is provided on the end surface of the inside end of the short tube 1, i.e., the inlet tube, to effectively reduce the abrasion of the inner surface of the bellows member 7 by the conveyed medium, thus the service life of the bellows member 7 can be lengthened and hence the service life of a shell-type bellows member 7 can be in conformity with that of the metal conduits. A gap 12 is formed between the left end of the antiwear ring 11 and the inside end of the short tube 2, i.e., the outlet tube, in order to meet the needs of axial expansion and contraction of the metal conduits. A gap 13 is formed between the outer wall surface of the antiwear ring 11 and the crest of the inside-oriented ripple in said bellows member 7, thus the ripply nodes of the bellows member 7 are allowed to be radially deformed in the gap as the bellows member being compressed. In this embodiment, the crest of the outside-oriented ripple of the bellows member 7 contacts the inner wall surface of said sleeve 3. As the bellows member 7 is deformed due to a radial force applying on, the sleeve 3 can serve as a rigid support.

Therefore, the bellows member 7, rigidly supported by the sleeve 3 and the trough-mated core 14, behaves like a quasi-rigid body against the applied radial forces, the stability of performance of the bellows member 7 is then remarkably improved and the trouble of 'failure of stabilization' for the shell-type bellows member, caused by applying excessive radial force, is avoided, and hence the reliability of operation of the bellows member 7 is effectively assured. Besides, reducing wall thickness of the bellows member 7, for the purpose of weakening the effect of the stress on the bellows member 7, is thus allowed. Because of the gap between the surface of the trough-mated core 14 and the inner surface of the trough of the ripply nodes of the inside-oriented crests, the bellows member 7 can keep exhibiting its original expansibility as the metal conduits move axially, therefore the expansion joint device 10 of the present invention is reliable on its working performance.

FIG. 7 shows a variation of the expansion joint device of FIG. 4, in which the two ends of the sleeve 3 are both free ends, i.e., the two short tubes are both axially movable with respect to the sleeve 3, which can meet the needs of axial expansion and contraction of the metal conduits. In accordance with the embodiment, the inner surface of said sleeve 3 is formed with a recess portion 20. Both the crest of a ripply node of the outside-oriented ripple in the bellows member 7 and the outer wall surface of the trough-mated core 14 contact the bottom surface of the recess portion 20, thus the sleeve 3, having its two free ends, is prevented from being excessively displaced in its axial direction. The further details in the embodiment are shown in the figures.

The concepts and embodiments of the expansion joint device in accordance with the present invention has been described in detail with reference to the accompanying drawings. Additionally, further alternatives, which accord with the spirit and scope of the invention, are deemed to fall within the protective scope of the invention as defined in the appended claims. With regard to the bellows member illustrated in the description of the invention, it is readily concluded that the ripply node can have other types of profile form besides the semicircle, wrinkling, or crest-rounded profiles mentioned in the application. On this account, the profile form of the ripply node is defined in the present application as having any types of curve linked between two points, except straight line.

What is claimed is:

1. An expansion joint device used for metal conduits, comprising an inlet short tube, an outlet short tube and a sleeve, both the opposed inside ends of said two short tubes are in the inside of the sleeve and form a compensating gap between them, a bellows member having ripply nodes and being axially expansible with an external force applying on, is provided in the compensating gap formed between the opposed inside ends of the two short tubes and the two ends of the bellows member are respectively connected with the inside ends of the two short tubes in a sealed manner, at least one of the two ends of said sleeve is a free end with respect to the two short tubes, wherein the crests of the ripply nodes of an outside-oriented ripple in said bellows member contact or tend to contact an inner wall surface of said sleeve, a trough in a ripply node of an inside-oriented ripple in said bellows member is provided with a trough-mated core, and a gap is formed between surfaces of said trough and said trough-mated core, said gap enables said ripply node to be deformed without exceeding its elasticity limit, an outer wall surface of said trough-mated core contacts or tends to contact the inner wall surface of said sleeve, said trough-mated core has a combination structure composed of multiple-segments.

2. The expansion joint device used for metal conduits according to claim 1, wherein said trough-mated core comprises a rigid body and two elastic bodies attached to the two side surface of said rigid body respectively.

3. The expansion joint device used for metal conduits according to claim 1, wherein said trough-mated core comprises a rigid body and a flexible layer laid on the surface of said rigid body.

* * * * *